(12) United States Patent
Jones et al.

(10) Patent No.: US 6,923,423 B2
(45) Date of Patent: Aug. 2, 2005

(54) SMALL BORE GATE VALVE

(75) Inventors: Taylor L. Jones, Houston, TX (US);
Philip Hernandez, Stafford, TX (US);
Archie L. Smith, Marble Falls, TX (US); David E. Cain, New Braunfels, TX (US); Gregory L. Glidden, Spring, TX (US); Christopher D. Bartlett, Spring, TX (US); Christopher E. Cunningham, Spring, TX (US); Paul P. Luangraj, Houston, TX (US)

(73) Assignee: FMC Technologies, Inc., Chicago, IL (US)

( * ) Notice: Subject to any disclaimer, the term of this patent is extended or adjusted under 35 U.S.C. 154(b) by 54 days.

(21) Appl. No.: 10/190,174

(22) Filed: Jul. 5, 2002

(65) Prior Publication Data

US 2003/0025094 A1 Feb. 6, 2003

Related U.S. Application Data

(60) Provisional application No. 60/303,540, filed on Jul. 6, 2001.

(51) Int. Cl.[7] .......................... E21B 7/12; F16K 31/143
(52) U.S. Cl. ..................... 251/14; 251/63.6; 251/328; 251/360; 166/373
(58) Field of Search .................. 251/14, 63.5, 63.6, 251/328, 360; 166/373

(56) References Cited

U.S. PATENT DOCUMENTS

| 3,635,436 | A |   | 1/1972  | Tillman |
|-----------|---|---|---------|---------|
| 3,933,338 | A |   | 1/1976  | Herd et al. |
| RE30,115  | E |   | 10/1979 | Herd et al. |
| 4,230,299 | A |   | 10/1980 | Pierce, Jr. |
| 4,467,833 | A | * | 8/1984  | Satterwhite et al. ....... 251/63.4 |
| 4,572,298 | A | * | 2/1986  | Weston ....................... 251/327 |
| 4,809,733 | A |   | 3/1989  | Hawkins |
| 6,145,594 | A | * | 11/2000 | Jones ......................... 166/368 |

FOREIGN PATENT DOCUMENTS

| DE | 2152748     | * | 4/1973  | ............. F16K/3/20 |
|----|-------------|---|---------|------------------------|
| EP | 0 624 711 A1|   | 11/1994 |                        |
| GB | 2 369 176 A |   | 5/2002  |                        |

* cited by examiner

*Primary Examiner*—Eric Keasel
(74) *Attorney, Agent, or Firm*—Henry C. Query, Jr.

(57) ABSTRACT

A gate valve comprises a valve body, a stem bore which extends through the valve body, a stem which is disposed in the stem bore and which includes a first stem portion that is sealed to the stem bore, a second, smaller diameter stem portion that is sealed to the stem bore, and a gate pocket that is located between the first and second stem portions, and gate which is disposed within the gate pocket between the first and second seats.

14 Claims, 15 Drawing Sheets

SMALL BORE GATE VALVE

This application is based on U.S. Provisional Patent Application No. 60/303,540, which was filed on Jul. 6, 2001.

BACKGROUND OF THE INVENTION

The present invention relates generally to gate valves. More particularly, the invention relates to small bore gate valves for use with subsea oil and gas well equipment.

The construction and operation of gate valves are well known in the art. In order to open a typical gate valve, several forces must usually be overcome. The first force is the gate-seat drag, which is related to the area of the flow bore and the working pressure of the gate valve. The second force is the stem-packing drag, which is related to the sealing diameter of the stem. The third force is caused by any unbalanced fluid forces acting on the stem.

In gate valves with relatively large bores (that is, those several inches or more in diameter), the required opening force is dominated by the gate-seat drag. This is due to the fact that the gate-seat drag is proportional to the square of the flow bore diameter, while the stem-packing drag is directly proportional to the stem diameter. The challenge in designing gate valves with relatively small flow bores, for example, less than about an inch in diameter, is that as the diameters of the flow bore and the stem are scaled down, the drop in the gate-seat drag is much greater than the drop in the stem-packing drag. Eventually, the stem-packing drag begins to dominate the required opening force. This sets a lower limit on the stem diameter if a desired opening force is to be maintained. Consequently, the overall dimensions for small bore gate valves are often disproportionately large when compared to large bore gate valves.

SUMMARY OF THE INVENTION

These and other problems with the prior art are addressed by providing a gate valve which comprises a valve body that includes a stem bore which extends therethrough and a seat bore which extends therethrough and intersects the stem bore generally transversely. A stem is disposed in the stem bore and includes a first stem portion that is sealed to the stem bore, a second stem portion that is sealed to the stem bore, and a gate pocket that is located between the first and second stem portions. First and second seats are each positioned at least partially within the seat bore proximate the gate pocket and each include a flow bore that extends therethrough. The gate valve also includes a gate which is disposed within the gate pocket between the first and second seats, a first actuator for moving the gate from a first position to a second position, and a second actuator for moving the gate from the second position to the first position. One of the first and second positions corresponds to an open position in which a through bore in the gate is aligned with the flow bores in the first and second seats, and the other position corresponds to a closed position in which the through bore is offset from the flow bores. Also, in accordance with the present invention the diameter of the first stem portion is larger than the diameter of the second stem portion.

The first actuator is preferably a hydraulic chamber which is connected to a source of hydraulic control fluid and which is in communication with a first end of the stem proximate the first stem portion. The second actuator is ideally a spring which is functionally disposed between the stem and the valve body. More preferably, the gate valve comprises a spring housing which is connected to the valve body over a second end of the stem bore proximate the second stem portion and a spring retaining flange which is connected to a second end of the stem proximate the second stem portion, and the spring is positioned between the spring housing and the spring retaining flange.

In operation of the gate valve of the present invention, the hydraulic fluid pressure required to move the gate from, for example, the closed position to the open position must be sufficient to overcome the gate-seat drag, the stem-packing drag, and the return force of the spring. In addition, the opening pressure must be great enough to overcome the unbalanced load on the stem which results from the pressure of the working fluid on the different diameters of the first and second stem portions. Therefore, the diameters of the first and second stem portions may be specifically selected to provide a desired resistance to the opening of the gate, while the diameters of both stem portions, and thus the overall dimensions of the gate valve, may be maintained suitably small.

These and other objects and advantages of the present invention will be made apparent from the following detailed description, with reference to the accompanying drawings. In the drawings, the same reference numbers are sometimes used to denote similar components in the various embodiments.

DETAILED DESCRIPTION OF THE PREFERRED EMBODIMENTS

Figure 1:
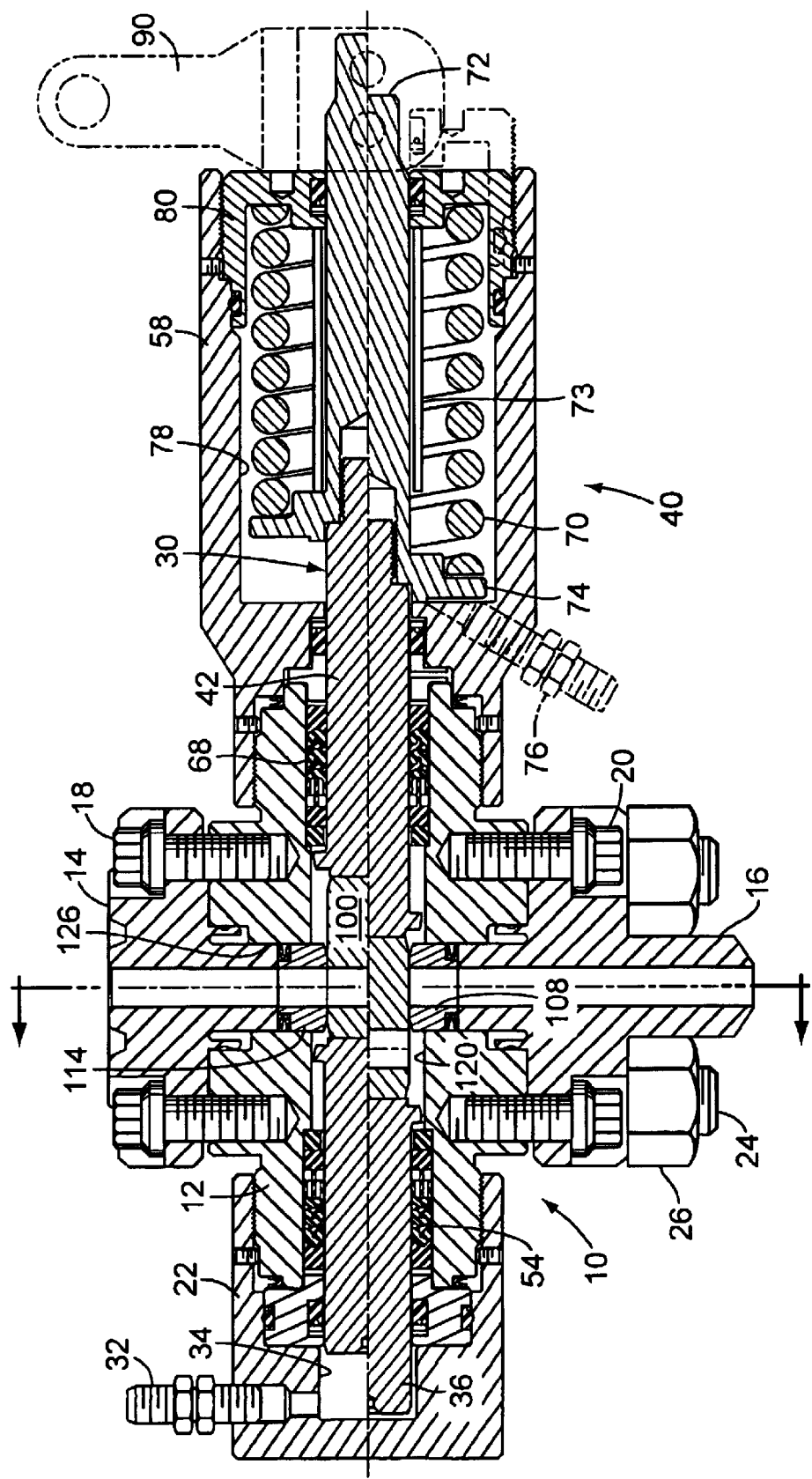
FIG. 1 is a longitudinal cross-sectional view of one embodiment of the gate valve of the present invention, with the valve shown in its open position above the longitudinal centerline of the valve stem and in its closed position below the longitudinal centerline of the valve stem.

Referring to FIG. 1, the gate valve of the present invention, which is indicated generally by reference number 10, comprises a valve body 12 which includes a stem bore 120 that extends longitudinally therethrough and a seat bore 126 that extends transversely therethrough and intersects the stem bore. A valve stem 30 is positioned in the stem bore and comprises a first stem portion 36 and a second stem portion 42. As best seen in FIG. 2c, the diameter of the first stem portion 36 is larger than the diameter of the second stem portion 42. Referring still to FIG. 2c, the stem 30 also includes a gate pocket 128 which is located between the first and second stem portions 36, 42. A floating gate 100 is disposed in the gate pocket 128 between an upper seat 114 and a lower seat 108, each of which is positioned at least partially in the seat bore 126.

Figure 2A:
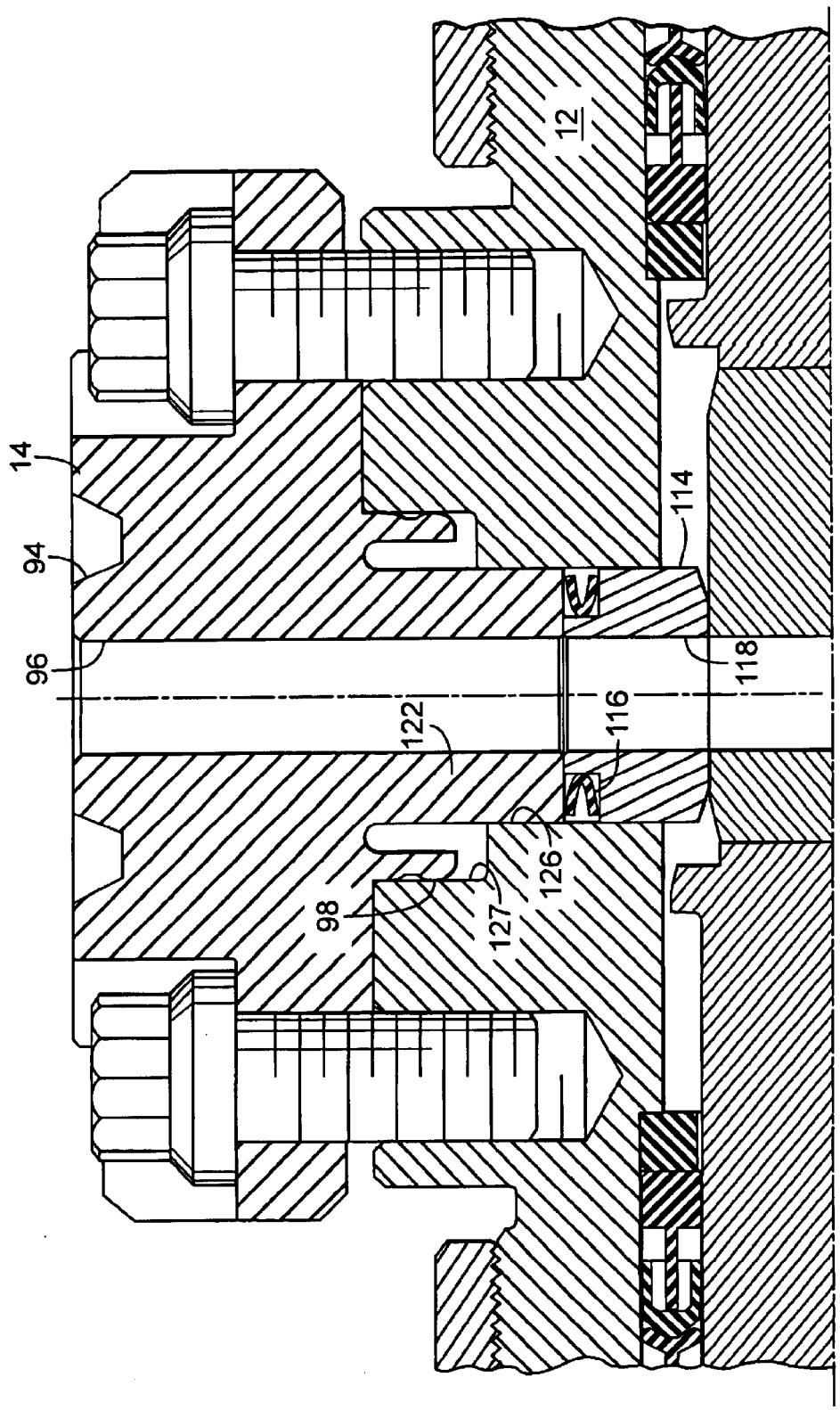
FIG. 2a is an enlarged view of the upper retaining flange component of the gate valve shown in FIG. 1.

Referring to FIGS. 1 and 2a, the upper seat 114 is retained in the seat bore 126 by an upper seat retaining flange 14, which is secured the valve body 12 such as by a number of bolts 18. A seal 116 is ideally provided between the upper seat 114 and the upper seat retaining flange 14. In addition, the seat bore 126 includes an upper counterbore 127, and a preferably metal seal 98 extends from the seat retaining flange 14 and seals against the counterbore. The seat retaining flange 14 is also provided with a flow bore 96, which is substantially aligned with a flow bore 118 in the upper seat 114. Furthermore, for reasons to be described below, the upper surface of the upper seat retaining flange 14 may be provided with a seal profile 94.

Figure 2B:
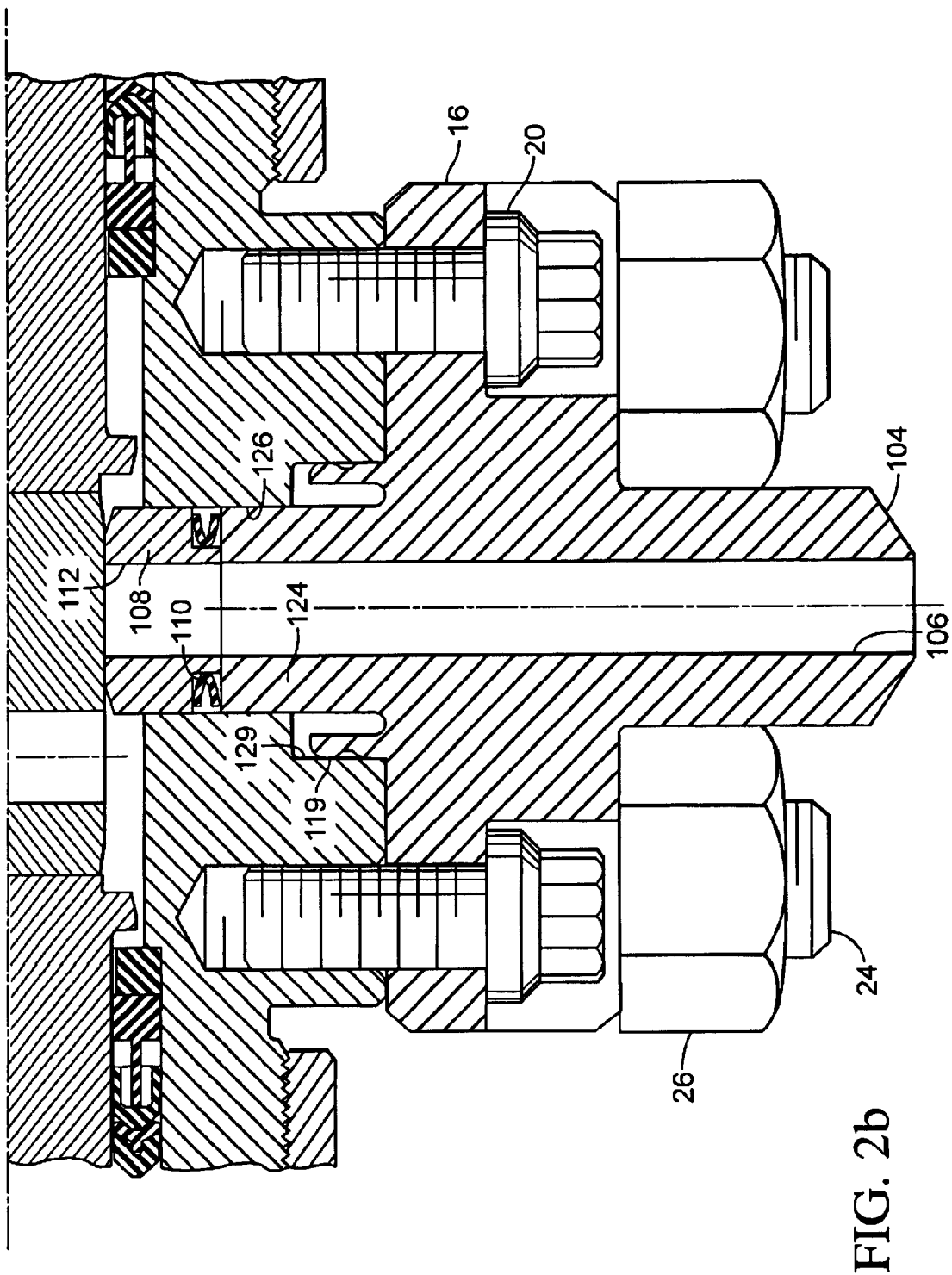
FIG. 2b is an enlarged view of the lower retaining flange component of the gate valve shown in FIG. 1.
Figure 2C:
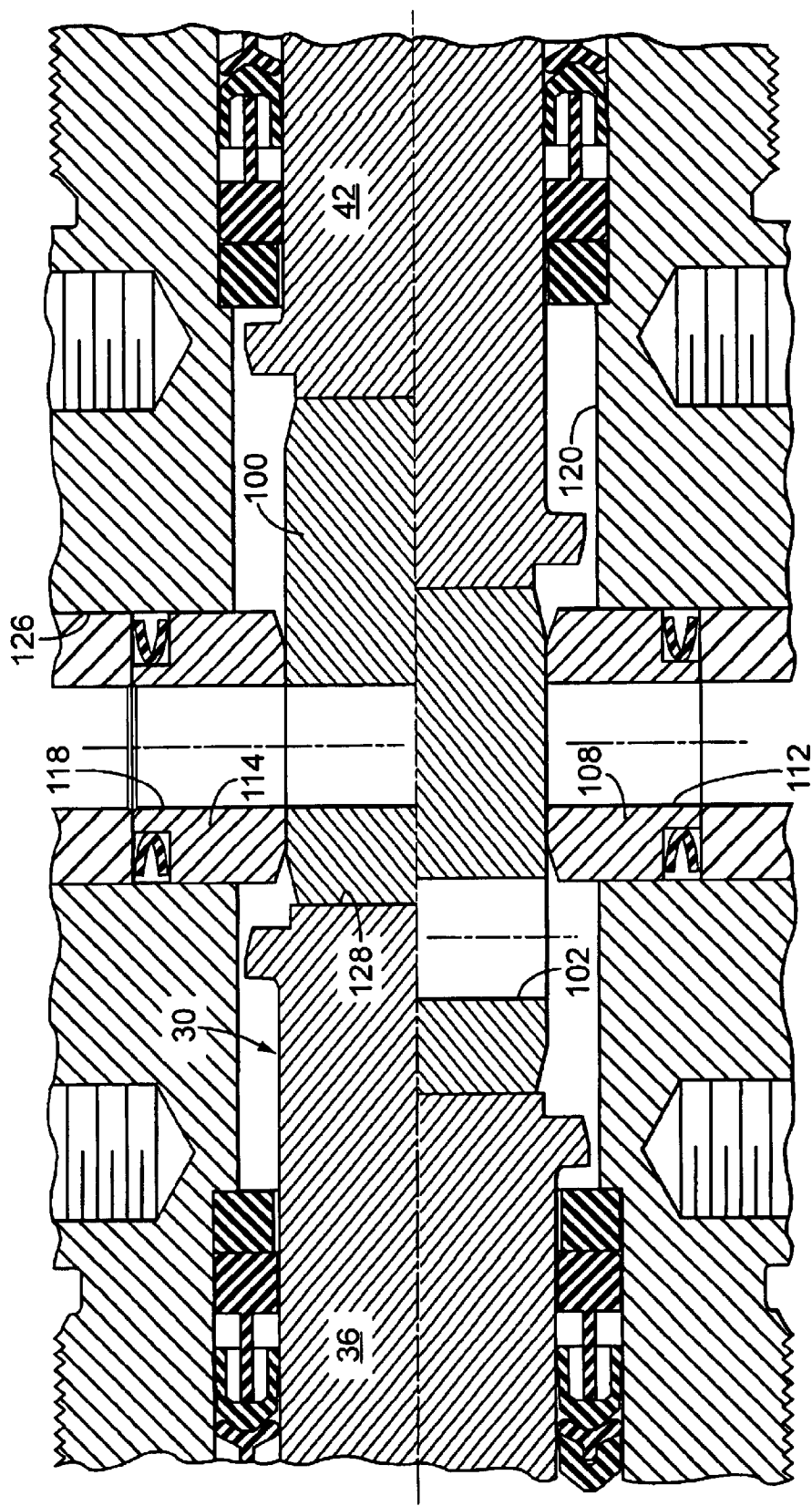
FIG. 2c is an enlarged view of the gate and seat components of the gate valve shown in FIG. 1.

Referring to FIGS. 1 and 2b, the lower seat 108 is retained in the seat bore 126 by a lower seat retaining flange 16, which is secured to the valve body 12 such as by a number of bolts 20. A seal 110 is ideally provided between the lower seat 108 and the lower seat retaining flange 16. In addition, the seat bore 126 includes a lower counterbore 129, and a preferably metal seal 119 extends from seat retaining flange 16 and seals against the counterbore. The seat retaining flange 16 is also provided with flow bore 106, which is substantially aligned with a flow bore 112 in the lower seat 108. Furthermore, for reasons to be described below, the lower end of the lower seat retaining flange 16 may be provided with a weld preparation 104.

Referring to FIGS. 1, 2a, 2b and 4, the gate valve 10 may be attached to an item of subsea equipment (not shown) using, for example, a number of threaded studs 24 and nuts 26. The seal profile 94 in the upper seat retaining flange 14 is adapted to accept a seal (not shown), which seals between the retaining flange and the subsea equipment. In addition, the weld preparation 104 allows the lower seat retaining flange 16 to be welding to an external pipe (not shown). It should be noted, however, that any suitable combination of mounting devices, seals, or connectors may be used on the respective seat retaining flanges 14, 16. If, for example, the gate valve 10 is not to be mounted on an item of equipment, both retaining flanges 14, 16 could be provided with a weld preparation and the mounting studs 24 and nuts 26 could be eliminated.

Figure 3:
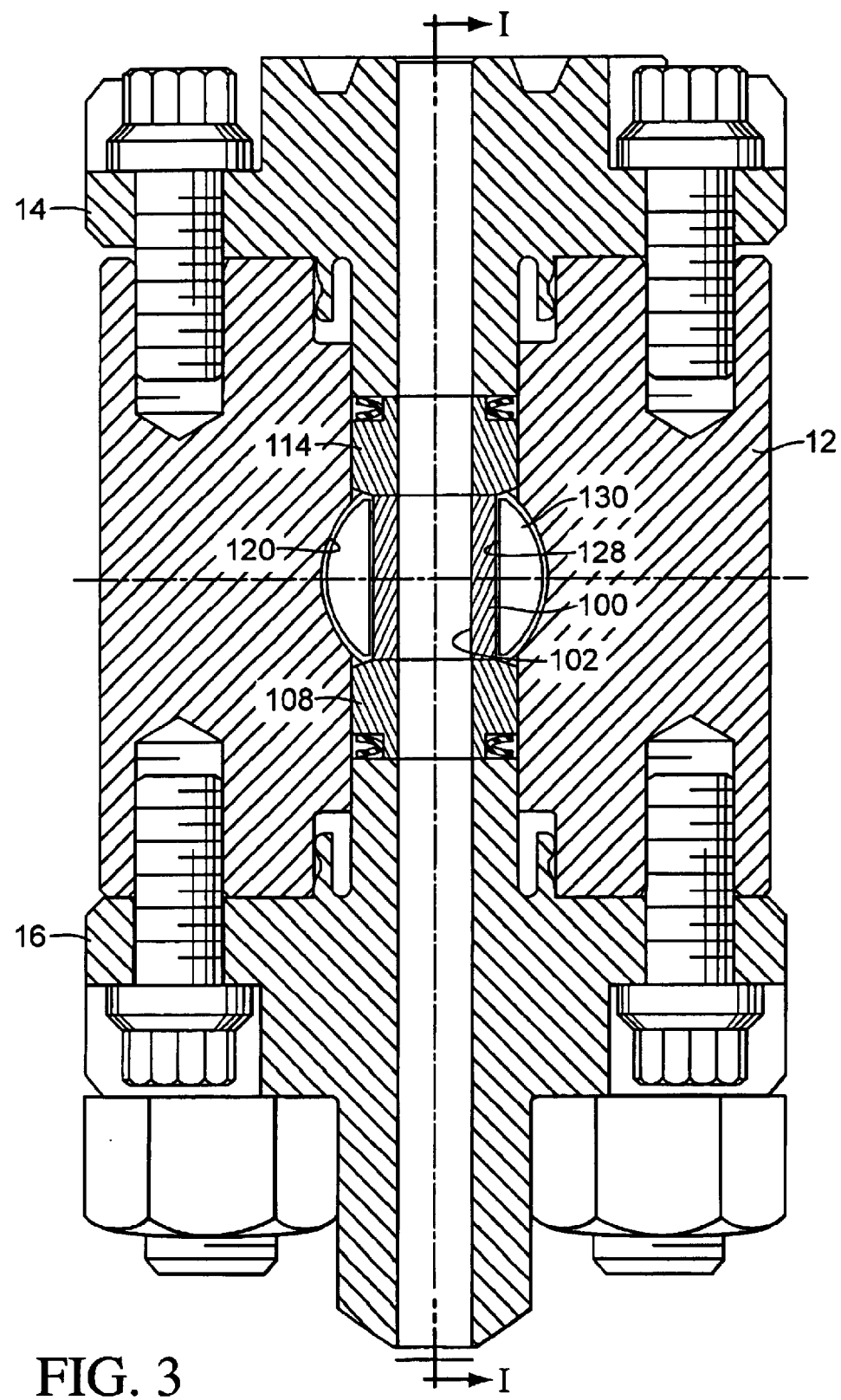
FIG. 3 is an enlarged, transverse cross-sectional view of the gate and seat components of the gate valve shown in FIG. 1.
Figure 4:
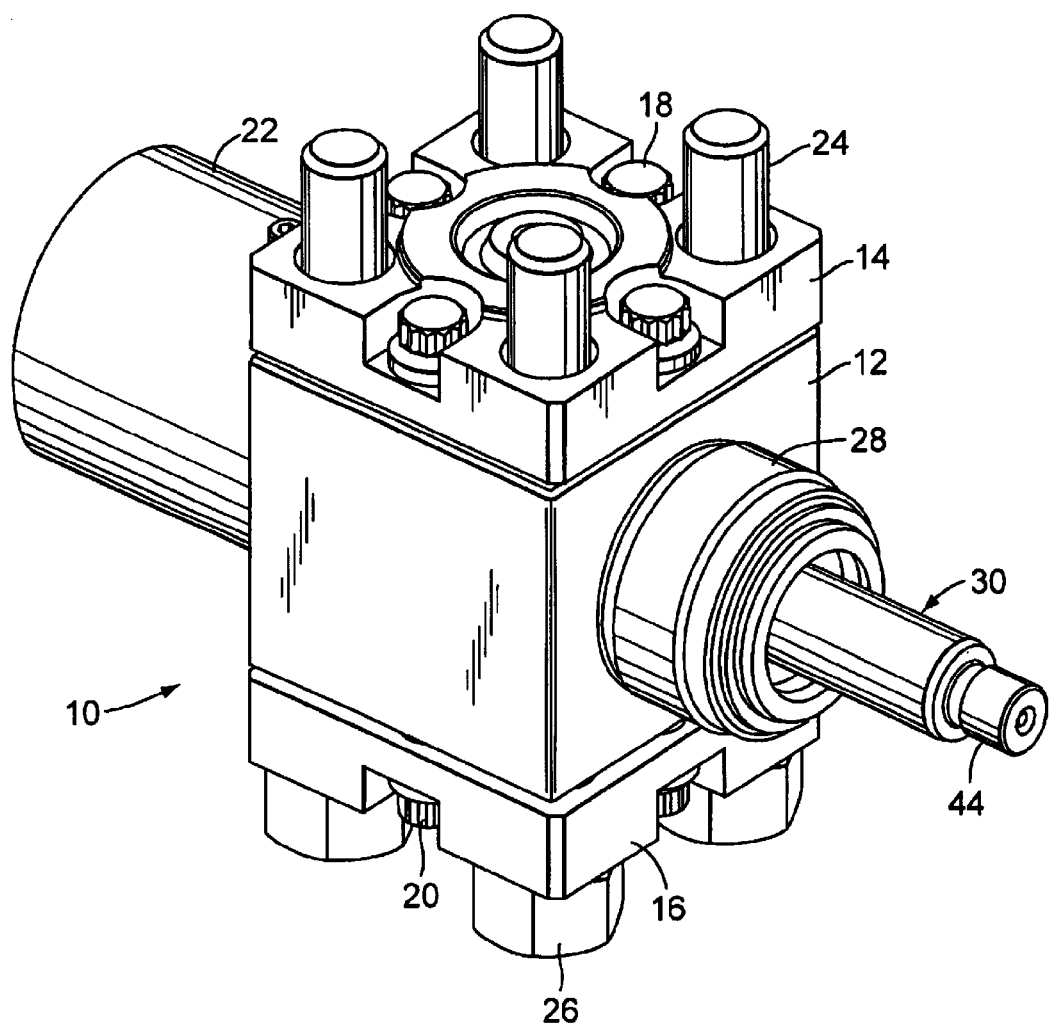
FIG. 4 is a perspective view of the gate valve shown in FIG. 1 with the spring return assembly removed.

Referring to FIGS. 1, 2c and 3, the gate 100 comprises a through bore 102 which is substantially aligned with the flow bores 118, 112 in the upper and lower seats 114, 108, respectively, when the gate valve 10 is in the open position, which is shown above the longitudinal centerline of the stem 30 in FIGS. 1 and 2c. In the closed position, which is shown below the longitudinal centerline of the stem 30 in FIGS. 1 and 2c, the through bore 102 is offset from the flow bores 118, 112, thus preventing flow through the gate valve 10. As shown in FIG. 3, the gate pocket 128 in the stem 30 defines a pair of web portions 130 which maintain the gate 100 in proper alignment with the seats 114 and 108.

Figure 2D:
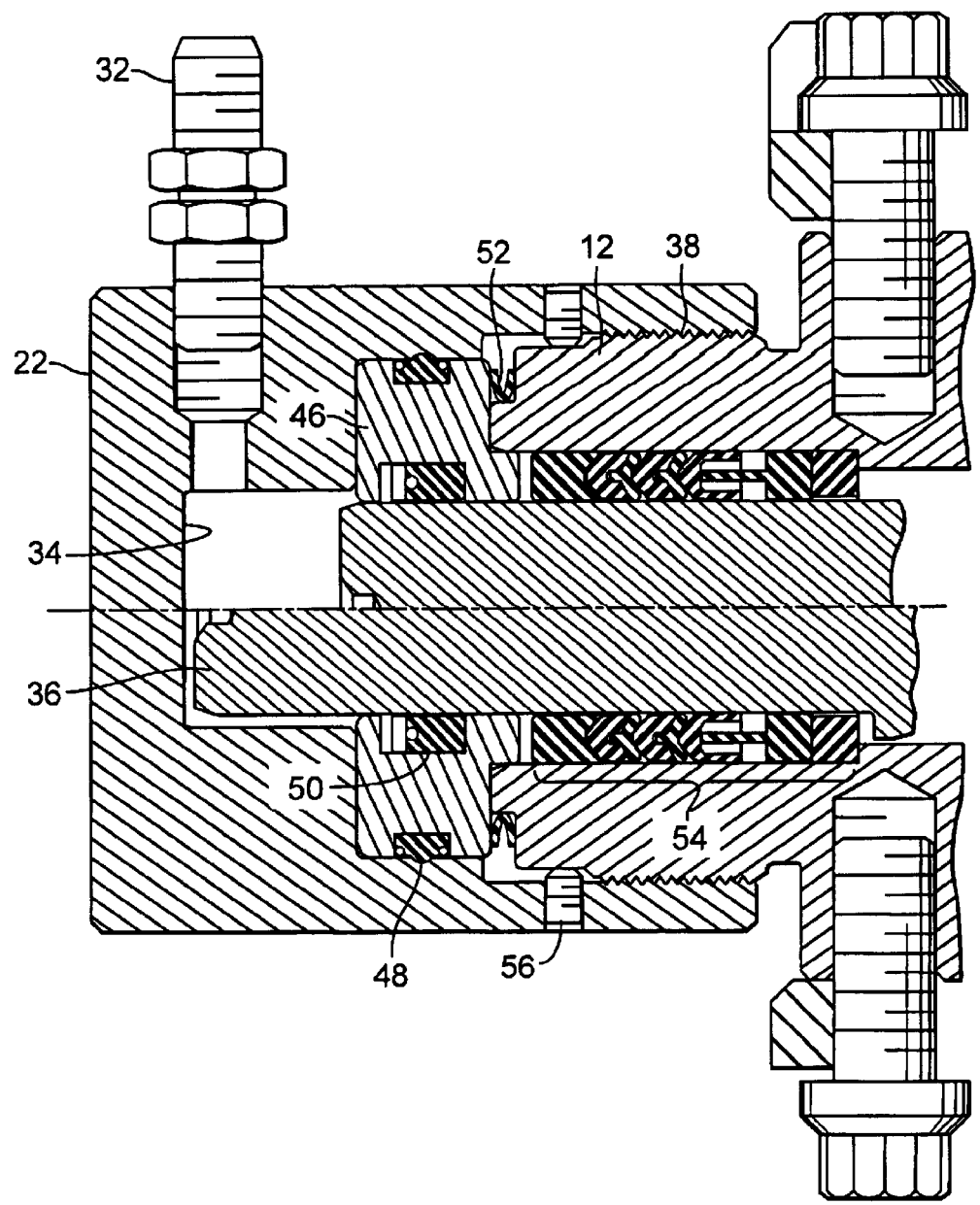
FIG. 2d is an enlarged view of the cylinder housing component of the gate valve shown in FIG. 1.

Referring to FIGS. 1 and 2d, the first stem portion 36 of the stem 30 is sealed to the stem bore 120 via a first stem packing 54. In addition, the first stem portion 36 extends beyond a corresponding end of the valve body 12. A cylinder housing 22 is preferably threaded to the end of the valve body 12 generally at 38. A spacer 46 is ideally disposed between the cylinder housing 22, the valve body 12 and the first stem portion 36. The spacer 46 carries a seal 50 which seals between the spacer and the first stem portion 36. The spacer 46 also carries a seal 48 which seals between the spacer and the cylinder housing 22. The cylinder housing 22, the spacer 48, the first stem portion 36, and the seals 48 and 50 cooperate to form a hydraulic chamber 34. The chamber 34 is connected to a source of hydraulic control fluid (not shown) via a hydraulic coupler 32. The control fluid acts on the stem 30 to force the gate 100 to the right and into the open position. A seal 52 is preferably provided between the valve body 12 and the spacer 46 to prevent seawater from reaching the seals 48, 50 and the stem packing 54. In addition, a set screw 56 may be provided to prevent the cylinder housing 22 from becoming unscrewed from the valve body 12.

Figure 2E:
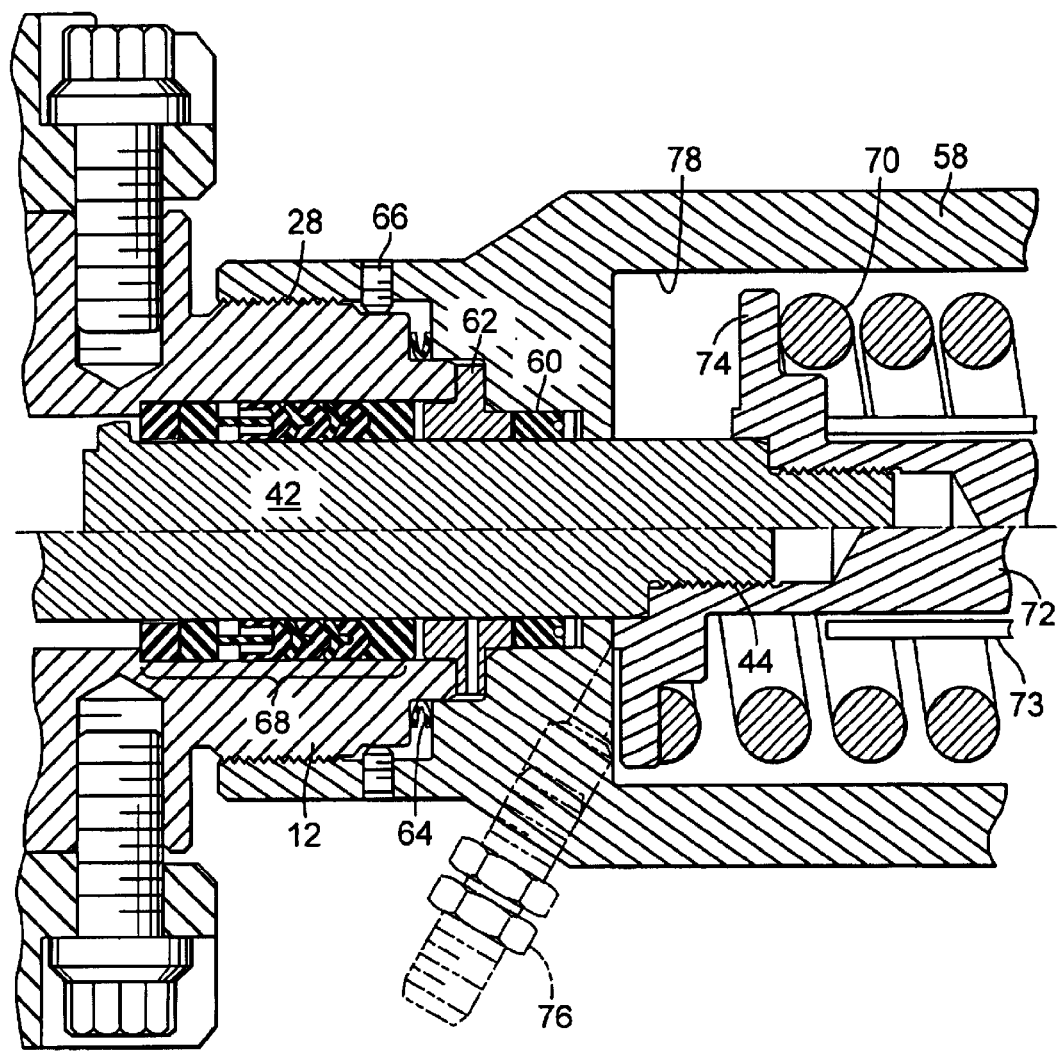
FIGS. 2e and 2f are enlarged views of the left and right hand portions, respectively, of the spring housing component of the gate valve shown in FIG. 1.
Figure 2F:
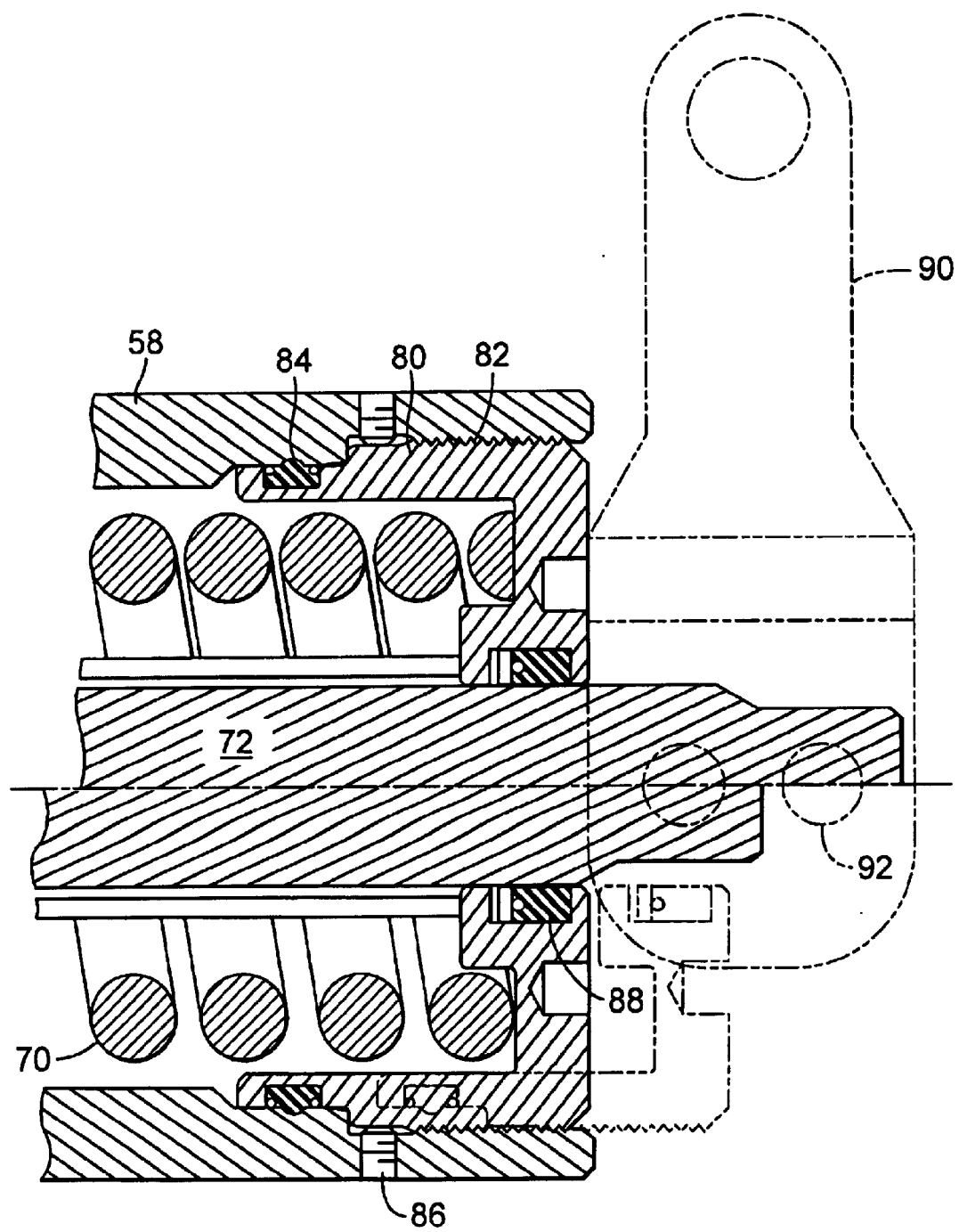

Referring to FIGS. 1, 2e and 2f, the second stem portion 42 of the stem 30 is sealed to the stem bore 120 via a second stem packing 68. In addition, the second stem portion 42 extends beyond a corresponding end of the valve body 12 and terminates in a male threaded end 44. A spring housing 58 is threaded to the end of the valve body 12 generally at 28 and is sealed to the stem 30 via a seal 60. A spacer 62 is ideally provided between the valve body 12, the second stem portion 42 and the spring housing 58. A seal 64 is also preferably provided between valve body 12 and spring housing 58 to prevent seawater from reaching seal the 60 and the stem packing 68. In addition, a set screw 66 may be provided to prevent the spring housing 58 from becoming unscrewed from the valve body 12. The spring housing 58 defines spring chamber 78, which is optimally maintained at ambient sea pressure via a hydraulic connector 76.

A spring housing cap 80 is threaded into the open end of the spring housing 58 generally at 82. A seal 84 is provided between the spring housing 58 and the spring housing cap 80. In addition, a set screw 86 is ideally provided to prevent the spring housing cap 80 from becoming unscrewed from spring housing 58.

The threaded end 44 of the stem 30 is threaded into a stem extension 72, which includes a spring retaining flange 74 proximate its threaded end. The end of the stem extension opposite the spring retaining flange 74 extends through the spring housing cap 80 and is sealed thereto via a seal 88. A compression spring 70 is disposed between the spring housing cap 80 and the spring retaining flange 74. In addition, a support sleeve 73 is provided around the stem extension 72 to prevent the spring 70 from being completely compressed. Also, the end of the stem extension 72 is ideally rotatably pinned to a toggle lever 90 via a pin 92.

In operation of the gate valve 10, the hydraulic chamber 34 is pressurized to exert a force on the corresponding end of the stem 30. This will cause the stem 30 to move to the right (as viewed in the Figures), which will compress the spring 70 and move the gate 100 into the open position. In opening the gate valve 10, the opening pressure of the hydraulic fluid in the chamber 34 must be sufficient to overcome the gate-seat drag, the stem-packing drag and the return force of the spring 70. In addition, the opening pressure must be great enough to overcome the unbalanced load on the stem 30 which results from the pressure of the working fluid on the different diameters of the first and second stem portions 36, 42.

In order to close the gate valve 10, the pressure within the hydraulic chamber 34 is relieved. The return force of the spring 70 and the unbalanced load on the stem 30 will then combine to force the stem to the left, which will move the gate 100 back into the closed position. In the absence of control pressure (such as during a hydraulic failure), the gate valve 10 may be moved manually between the open and closed positions by operating the toggle lever 90.

Figure 5:
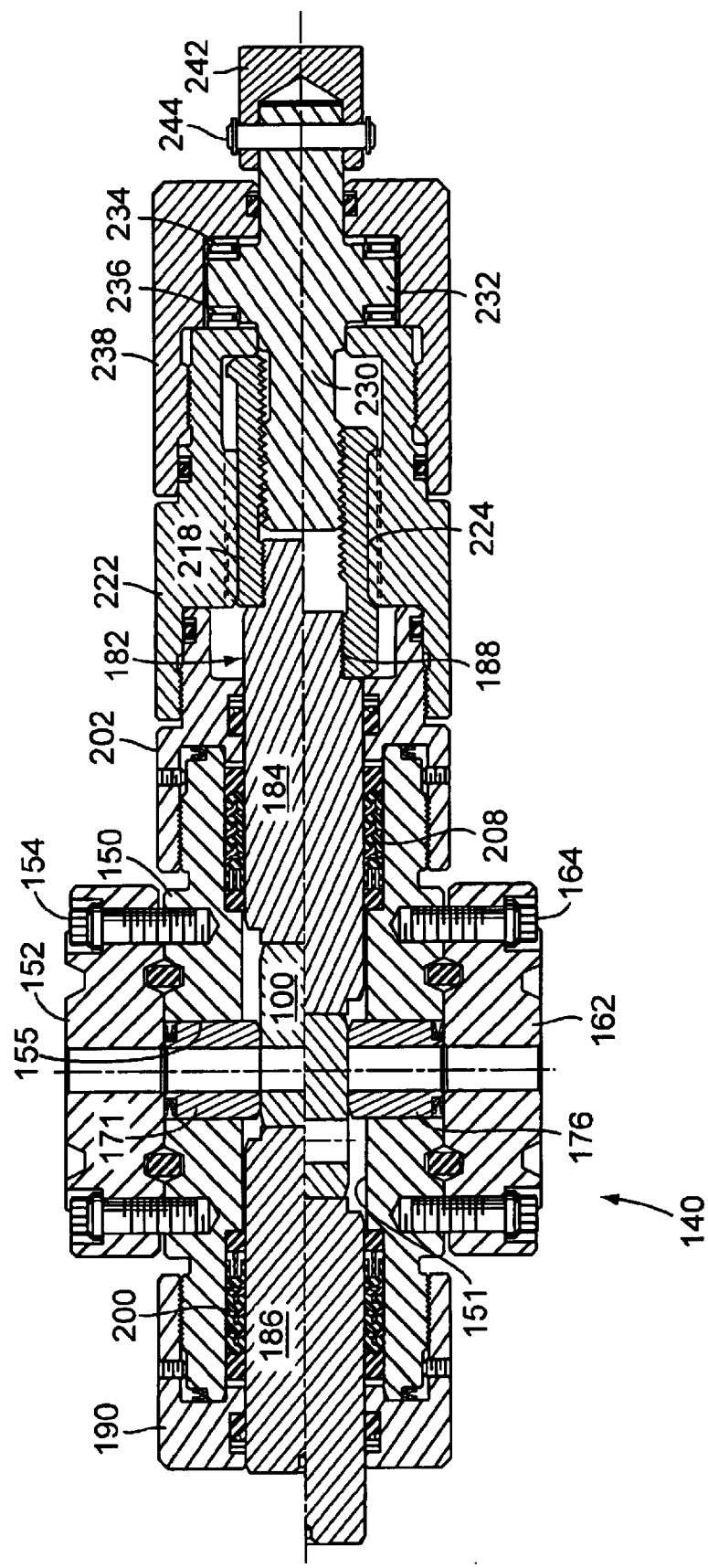
FIG. 5 is a longitudinal cross-sectional view of another embodiment of the gate valve of the present invention.

Referring now to FIG. 5, an alternative embodiment of the gate valve of the present invention, which is indicated generally by reference number 140, comprises a valve body 150 which includes stem bore 151 that extends longitudinally therethrough and a seat bore 155 that extends transversely therethrough and intersects the stem bore. A stem 182 is positioned in the stem bore and comprises first and second stem portions 184 and 186, respectively. In this embodiment of the invention, the diameters or the first and second stem portions 184, 186 are substantially equal. A floating gate 100 is disposed in the stem 182 in a manner similar to that discussed for the previous embodiment. The gate 100 is disposed between an upper seat 171 and a lower seat 176, each of which is positioned at least partially in the seat bore 155.

Figure 6A:
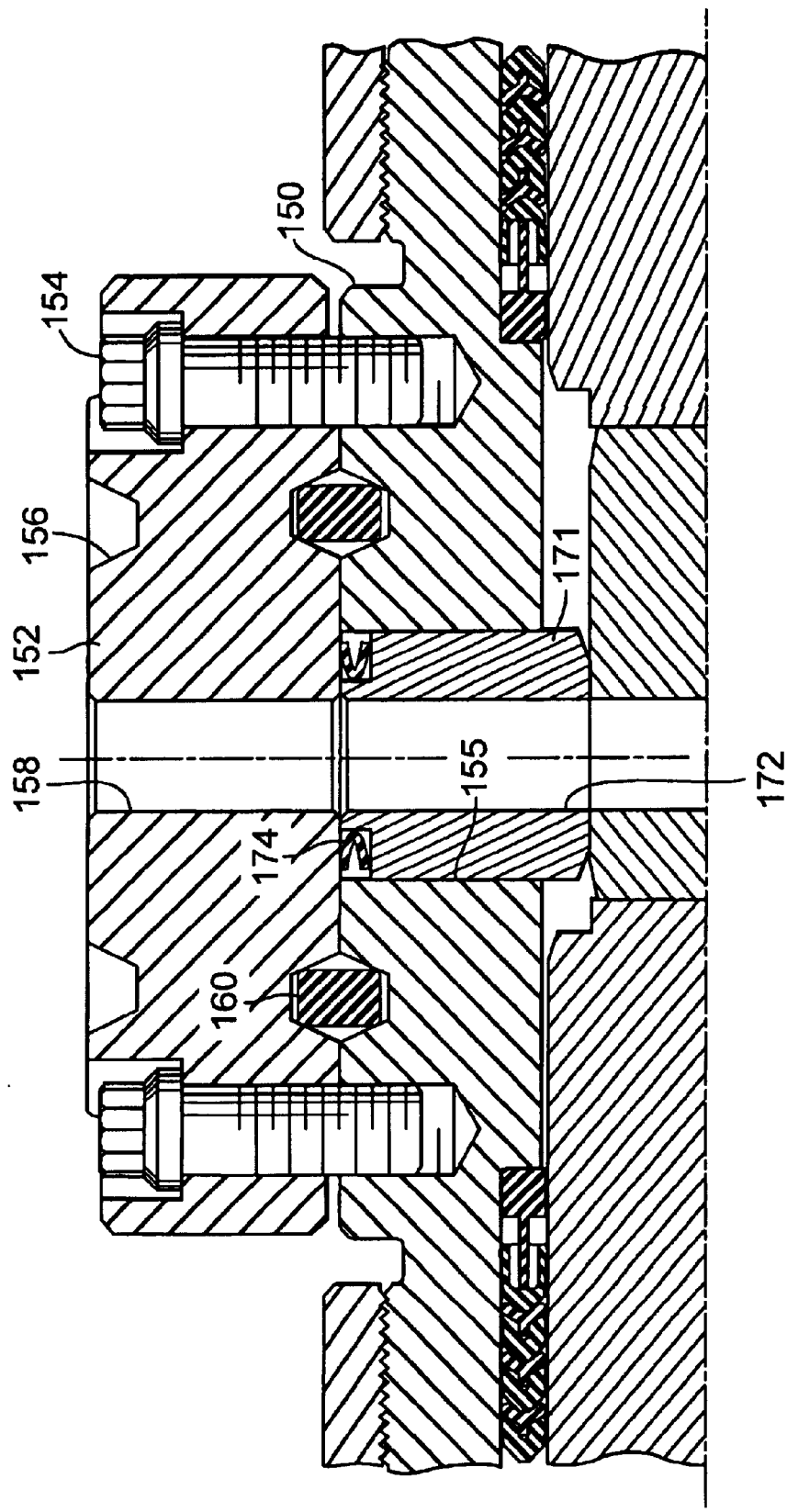
FIG. 6a is an enlarged view of the upper retaining flange component of the gate valve shown in FIG. 5.

Referring to FIGS. 5 and 6a, the upper seat 171 is retained in the seat bore 155 by an upper seat retaining flange 152, which is secured to the valve body 150 such as by a number of bolts 154. In addition, a seal 174 is provided between upper seat 171 and the upper seat retaining flange 152. A seal 160 is also provided between the valve body 150 and the upper seat retaining flange 152. The seat retaining flange 152 is provided with a flow bore 158, which is substantially aligned with flow a flow bore 172 in the upper seat 171. Also, the upper surface of the upper seat retaining flange 152 may be provided with a seal profile 156.

Figure 6B:
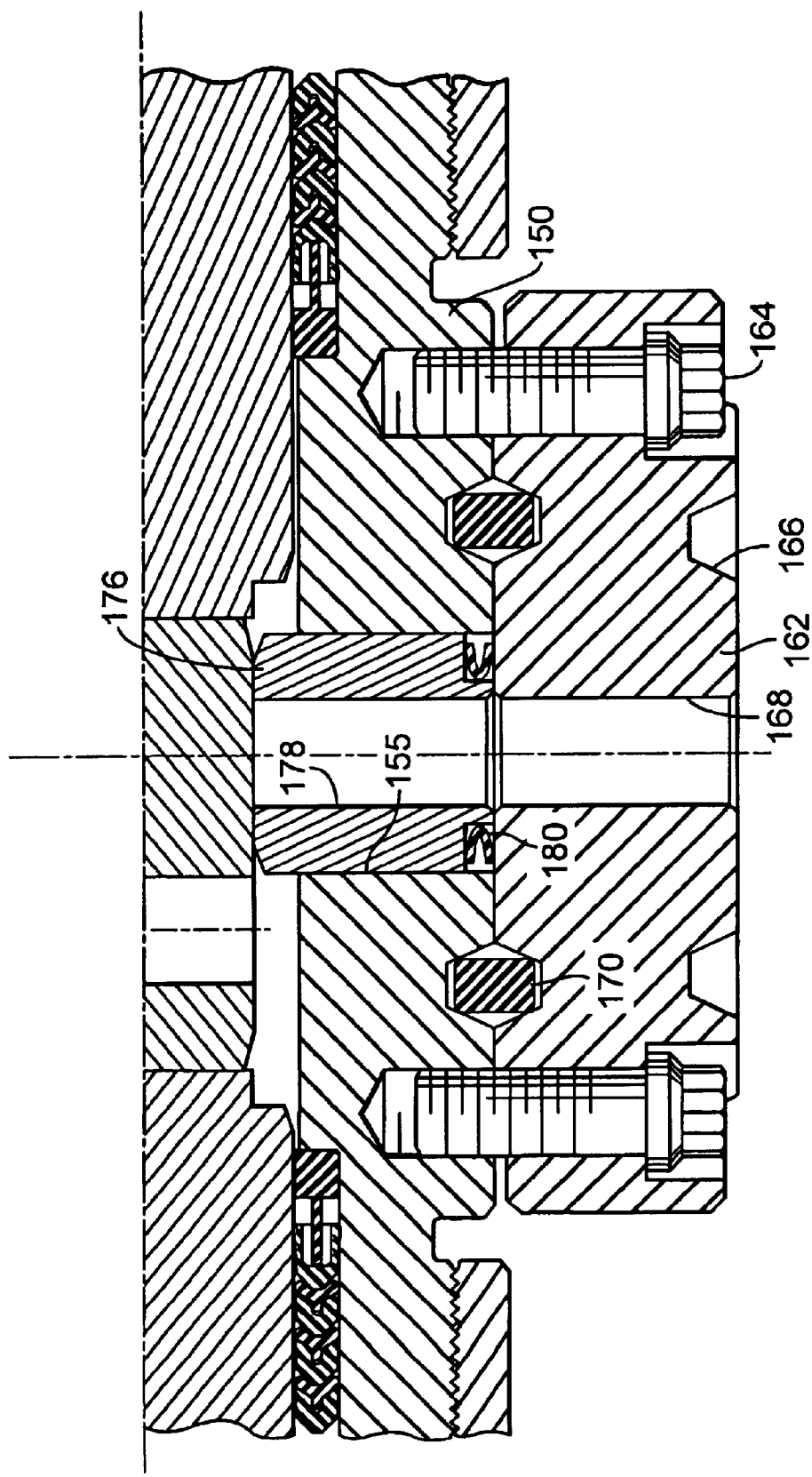
FIG. 6b is an enlarged view of the lower retaining flange component of the gate valve shown in FIG. 5.

Referring to FIGS. 5 and 6b, the lower seat 176 is retained in the seat bore 155 by a lower seat retaining flange 162, which is secured to the valve body 150 such as by a number of bolts 164. A seal 180 is provided between lower seat 176 and the lower seat retaining flange 162. In addition, a seal 170 is provided between the valve body 150 and the lower seat retaining flange 162. The seat retaining flange 162 is provided with flow bore 168, which is substantially aligned with a flow bore 178 in the lower seat 176. Also, the lower end of the lower seat retaining flange 162 may be provided with a seal profile 166.

Figure 6C:
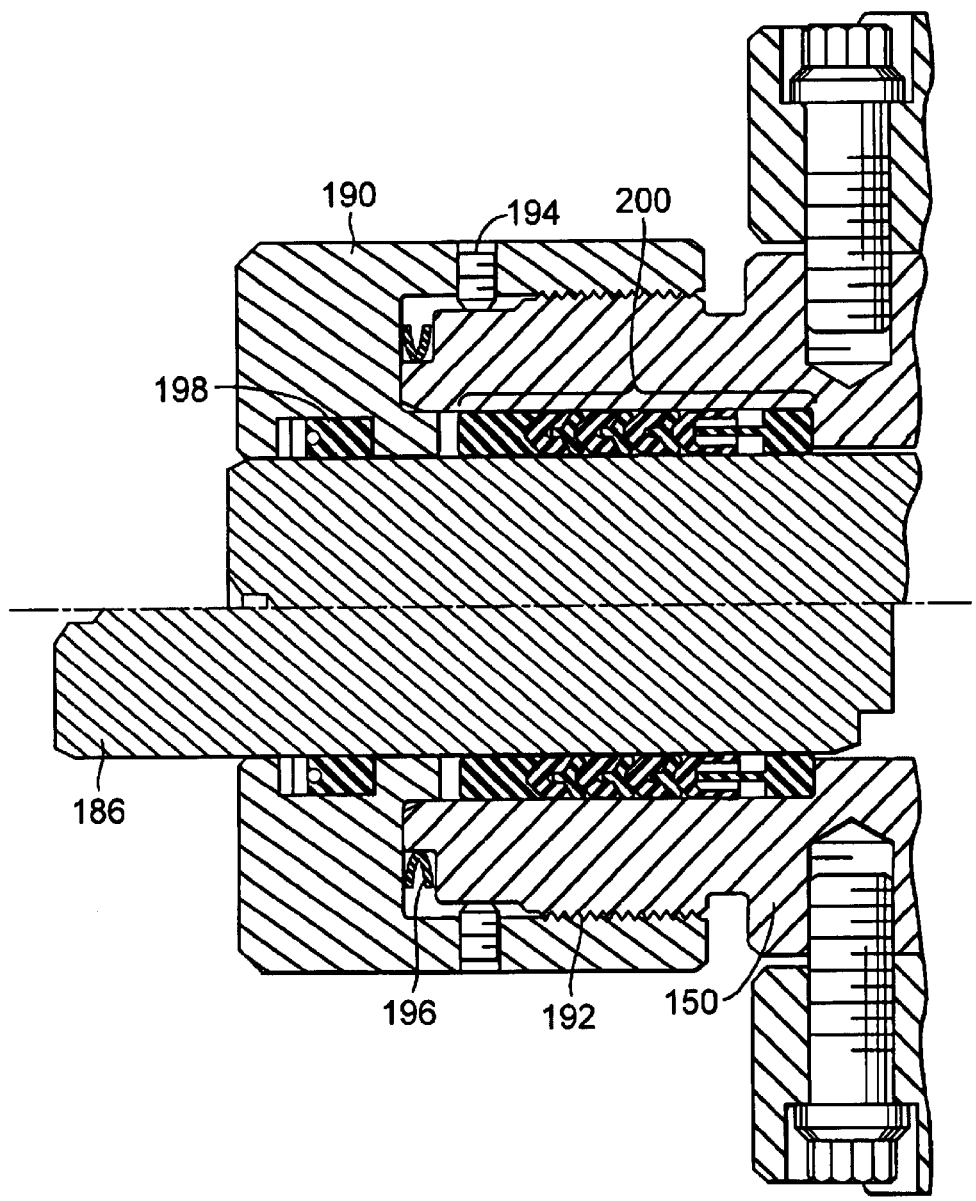
FIG. 6c is an enlarged view of the second end cap component of the gate valve shown in FIG. 5.

Referring to FIGS. 5 and 6c, the second stem portion 186 of the stem 182 is sealed to the stem bore 151 via a first stem packing 200. In addition, the second stem portion 186 extends beyond a corresponding end of the valve body 150. A first endcap 190 is threaded to the end of the valve body 150 generally at 192. A seal 198 is provided between the first endcap 190 and the second stem portion 186. In addition, a seal 196 is preferably provided between the valve body 150 and the first endcap 190 to prevent seawater from reaching the seal 198 and the stem packing 200. Furthermore, a set screw 194 is ideally provided to prevent the first endcap 190 from becoming unscrewed from the valve body 150. In the closed position of the gate valve 140, which is shown below the longitudinal centerline of the stem 182, the end of the second stem portion 186 extends beyond the first endcap 190.

Figure 6D:
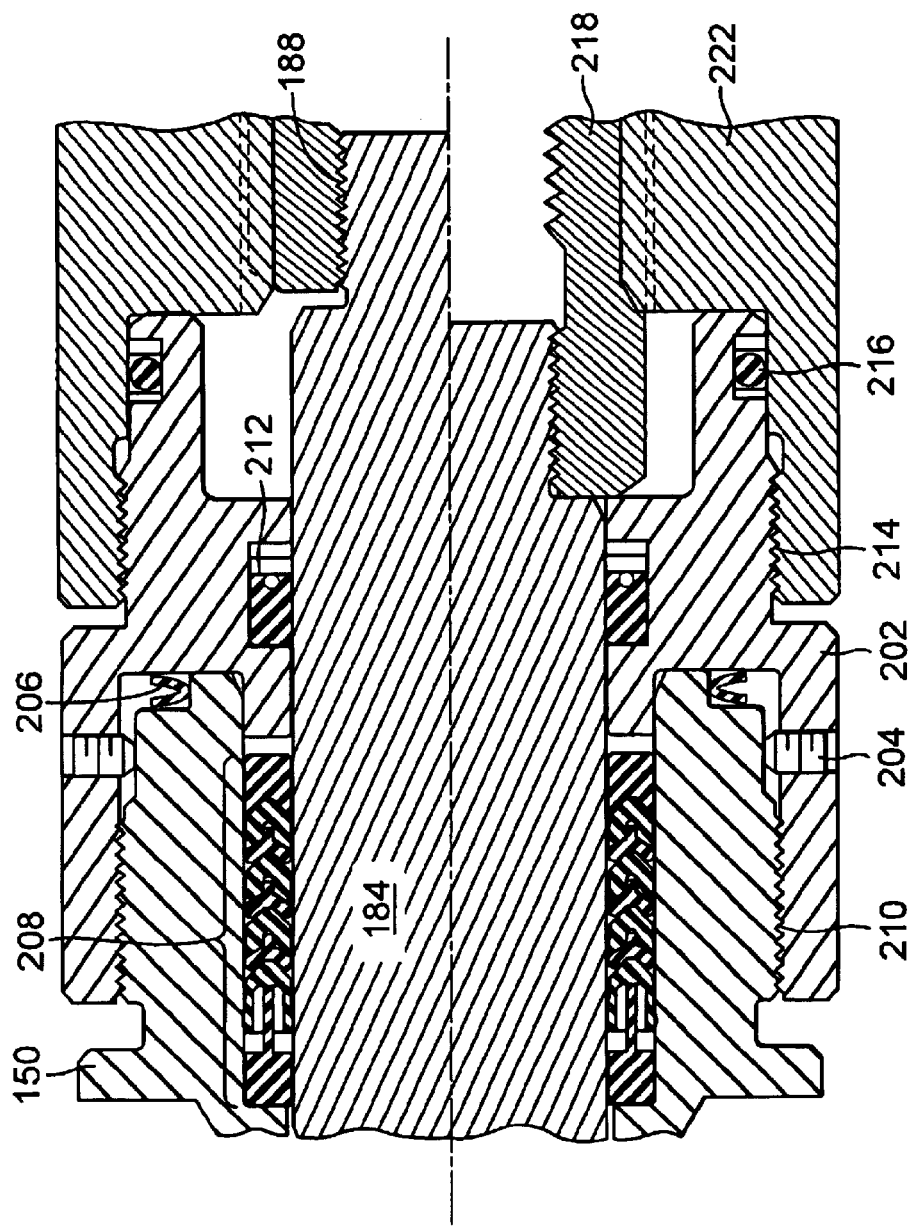
FIG. 6d is an enlarged view of the first end cap component of the gate valve shown in FIG. 5.

Referring to FIGS. 5 and 6d, the first stem portion 184 of the stem 182 is sealed to the stem bore 151 via a second stem packing 208. In addition, the first stem portion 184 extends beyond a corresponding end of the valve body 150 and terminates in a male threaded end 188. A lift nut 218, which is preferably hexagonal in cross-section, is threaded onto the threaded end 188 of the stem 182. A second endcap 202 is optimally threaded to the end of the valve body 150 generally at 210 and is sealed to the stem 182 via a seal 212. In addition, a seal 206 is preferably provided between valve body 150 and the second endcap 202 to prevent seawater from reaching the seal 212 and the stem packing 208. A set screw 204 is ideally provided to prevent the second endcap 202 from becoming unscrewed from the valve body 150.

Figure 6E:
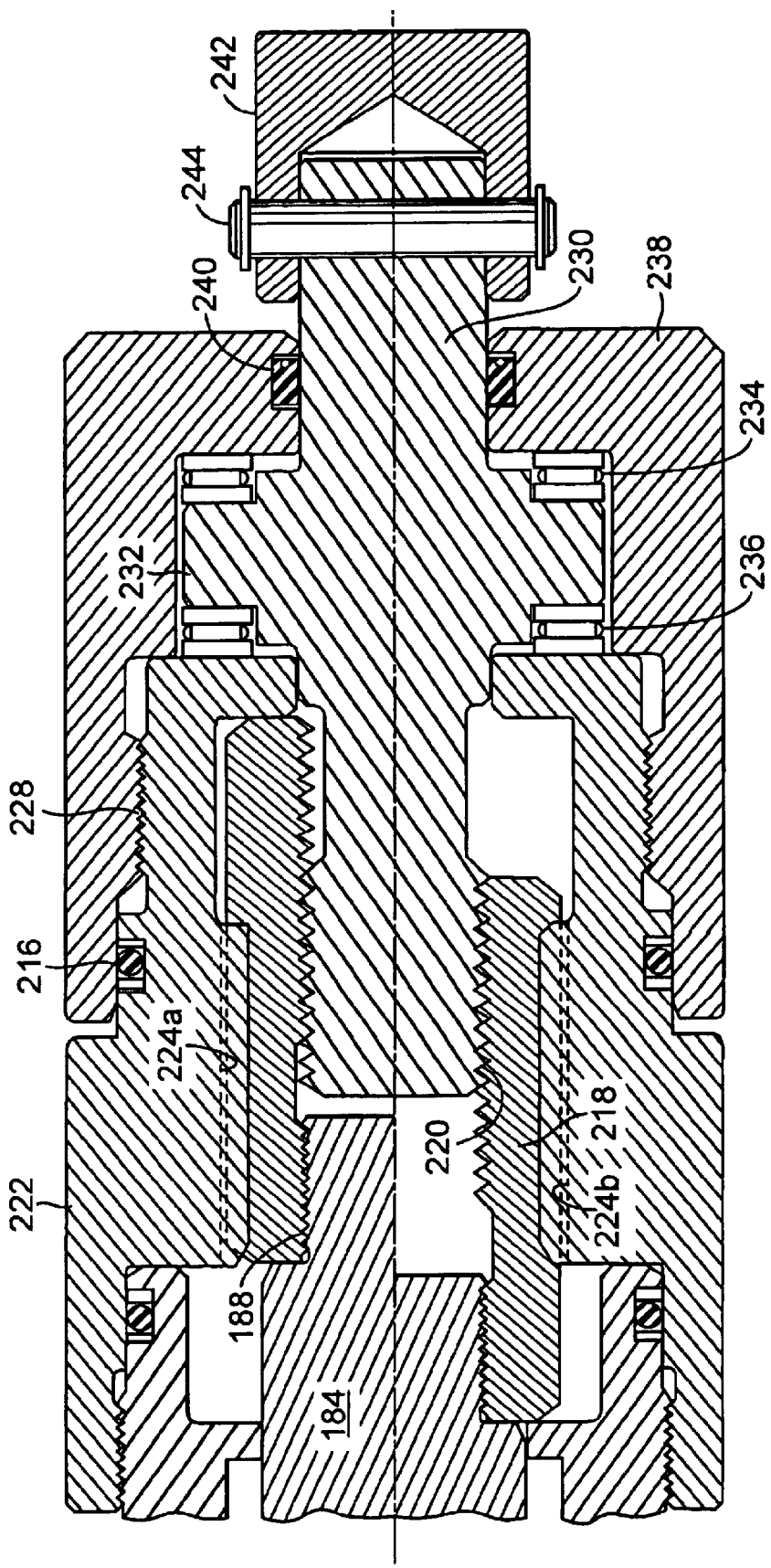
FIG. 6e is an enlarged view of the drive stem component of the gate valve shown in FIG. 5.

Referring also to FIG. 6e, an orientation sleeve 222 is threaded onto the second endcap 202 generally at 214 and is sealed thereto with a seal 216. The orientation sleeve 222 includes preferably two internal slots 224a and 224b which engage opposite corners of the lift nut 218, thereby preventing rotation of the lift nut. A drive stem 230 is threaded into the lift nut 218 generally at 220. A bearing sleeve 238 is threaded onto the orientation sleeve 222 generally at 228. The drive stem 230 comprises bearing flange 232 which is captured between the bearing sleeve 238 and the orientation sleeve 222. A pair of thrust bearings 234, 236 transfer the thrust loads from the drive stem 230 to the bearing sleeve 238 and the orientation sleeve 222. An end of the drive stem 230 opposite the lift nut 218 extends through the bearing sleeve 238 and is sealed thereto by a seal 240. In addition, the drive nut 242 is optimally pinned to the drive stem 230 via a pin 244.

In operation of the gate valve 140, the drive nut 242 is rotated using a wrench or other suitable means. The drive stem 230 rotates with the drive nut 242, and the threaded connection between lift nut 218 and the drive stem 230 causes the lift nut to move longitudinally within the orientation sleeve 222. The stem 182, and thus the gate 100, moves with the lift nut 218. In this manner, the gate valve 140 may be either opened or closed, depending on the direction of rotation of the drive nut 242.

It should be recognized that, while the present invention has been described in relation to the preferred embodiments thereof, those skilled in the art may develop a wide variation of structural and operational details without departing from the principles of the invention. For example, the various elements shown in the different embodiments may be combined in a manner not illustrated above. Therefore, the appended claims are to be construed to cover all equivalents falling within the true scope and spirit of the invention.

What is claimed is:

1. A gate valve which comprises:

a valve body which includes a stem bore that extends therethrough and a seat bore that extends therethrough and intersects the stem bore generally transversely;

a stem which is disposed in the stem bore and which includes a first stem portion that is sealed to the stem bore and a second stem portion that is sealed to the stem bore;

first and second seats which are each positioned at least partially within the seat bore and which each include a flow bore that extends therethrough;

a gate which is operatively connected to the first and second stem portions and is disposed between the first and second seats;

first actuating means for moving the gate from a first position to a second position;

second actuating means for moving the gate from the second position to the first position;

wherein one of the first and second positions corresponds to an open position in which a through bore in the gate is aligned with the flow bores in the first and second seats, and the other position corresponds to a closed position in which the through bore is offset from the flow bores;

a first seat retaining flange which is secured to the valve body over a first end of the seat bore;

wherein the first seat is retained in the seat bore between the gate and the first seat retaining flange; and wherein the first seat retaining flange comprises an integral metal seal which seals against the seat bore.

2. The gate valve of claim 1, further comprising:

a second seat retaining flange which is secured to the valve body over a second end of the seat bore;

wherein the second seat is retained in the seat bore between the gate and the second seat retaining flange.

3. The gate valve of claim 2, wherein the second seat retaining flange comprises an integral metal seal which seals against the seat bore.

4. The gate valve of claim 1, wherein the first actuating means comprises a hydraulic chamber which is connected to a source of hydraulic control fluid and which is in communication with a first end of the stem proximate the first stem portion.

5. The gate valve of claim 4, further comprising:

a cylinder housing which is connected to the valve body over a first end of the stem bore proximate the first end of the stem;

wherein the hydraulic chamber is defined between the cylinder housing and the first stem portion.

6. The gate valve of claim 1, wherein the second actuating means comprises a spring which is functionally disposed between the stem and the valve body.

7. The gate valve of claim 6, further comprising:

a spring housing which is connected to the valve body over a second end of the stem bore proximate the second stem portion; and a spring retaining flange which is connected to a second end of the stem proximate the second stem portion;

wherein the spring is positioned between the spring housing and the spring retaining flange.

8. The gate valve of claim 7, further comprising:

a stem extension which is connected to the second end of the stem;

wherein the spring retaining flange is integral with the stem extension.

9. The gate valve of claim 7, further comprising means for limiting the compression of the spring.

10. The gate valve of claim 9, wherein the limiting means comprises a support sleeve which is positioned between the spring housing and the spring retaining flange.

11. The gate valve of claim 7, further comprising means for manually moving the gate between the first and second positions.

12. A gate valve which comprises:

a valve body which includes a stem bore that extends therethrough and a seat bore that extends therethrough and intersects the stem bore generally transversely;

a stem which is disposed in the stem bore and which includes a first stem portion that is sealed to the stem bore, a second stem portion that is sealed to the stem bore, and a gate pocket that is located between the first and second stem portions;

first and second seats which are each positioned at least partially within the seat bore proximate the gate pocket and which each include a flow bore that extends therethrough;

a gate which is disposed within the gate pocket between the first and second seats;

first actuating means for moving the gate from a first position to a second position;

second actuating means for moving the gate from the second position to the first position;

wherein one of the first and second positions corresponds to an open position in which a through bore in the gate is aligned with the flow bores in the first and second seats, and the other position corresponds to a closed position in which the through bore is offset from the flow bores;

wherein the diameter of the first stem portion is larger than the diameter of the second stem portion;

wherein the second actuating means comprises a spring which is functionally disposed between the stem and the valve body;

a spring housing which is connected to the valve body over a second end of the stem bore proximate the second stem portion;

a spring retaining flange which is connected to a second end of the stem proximate the second stem portion;

wherein the spring is positioned between the spring housing and the spring retaining flange; and means for manually moving the gate between the first and second positions;

wherein the manual moving means comprises a toggle lever which is connected to the second end of the stem.

13. A gate valve which comprises:

a valve body which includes a stem bore and a seat bore that intersects the stem bore generally transversely;

a stem which is disposed in the stem bore and which includes first and second stem portions that are each sealed to the stem bore;

first and second seats which are each positioned at least partially within the seat bore;

a gate which is operatively connected to the first and second stem portions and is positioned between the first and second seats;

first actuating means for moving the gate from a first position to a second position;

second actuating means for moving the gate from the second position to the first position;

wherein one of the first and second positions corresponds to an open position in which a through bore in the gate is aligned with a flow bore in each of the first and second seats, and the other position corresponds to a closed position in which the through bore is offset from the flow bores;

wherein the first actuating means comprises a hydraulic chamber which is connected to a source of hydraulic control fluid and which is in communication with a first end of the stem proximate the first stem portion;

a cylinder housing which is connected to the valve body over a first end of the stem bore and which comprises a receptacle that is adapted to receive a corresponding portion of the valve body;

wherein the hydraulic chamber is defined between the cylinder housing and the first stem portion.

14. A gate valve which comprises:

a valve body which includes a stem bore and a seat bore that intersects the stem bore generally transversely;

a stem which is disposed in the stem bore and which includes first and second stem portions that are each sealed to the stem bore;

first and second seats which are each positioned at least partially within the seat bore;

a gate which is operatively connected to the first and second stem portions and is positioned between the first and second seats;

first actuating means for moving the gate from a first position to a second position;

second actuating means for moving the gate from the second position to the first position;

wherein one of the first and second positions corresponds to an open position in which a through bore in the gate is aligned with a flow bore in each of the first and second seats, and the other position corresponds to a closed position in which the through bore is offset from the flow bores;

a spring housing which is connected to the valve body over a second end of the stem bore and which comprises a receptacle that is adapted to receive a corresponding portion of the valve body; and a spring retaining flange which is connected to a second end of the stem proximate the second stem portion;

wherein the spring is positioned between the spring housing and the spring retaining flange.

\* \* \* \* \*